United States Patent
Petro-Roy et al.

(10) Patent No.: US 12,006,012 B2
(45) Date of Patent: Jun. 11, 2024

(54) STEERING APPARATUSES AND ACTUATOR APPARATUSES

(71) Applicant: MARINE ACQUISITION (US) INCORPORATED, Limerick, PA (US)

(72) Inventors: Mark Douglas Petro-Roy, Lansdale, PA (US); Richard Tyler Redfern, Chemainus (CA); Steven Len Dykhuizen, Burnaby (CA)

(73) Assignee: Marine Acquisition (US) Incorporated, Limerick, PA (US)

( * ) Notice: Subject to any disclaimer, the term of this patent is extended or adjusted under 35 U.S.C. 154(b) by 272 days.

(21) Appl. No.: 17/470,300

(22) Filed: Sep. 9, 2021

(65) Prior Publication Data

US 2022/0073178 A1    Mar. 10, 2022

Related U.S. Application Data

(60) Provisional application No. 63/076,286, filed on Sep. 9, 2020.

(51) Int. Cl.

| | |
|---|---|
| B63H 20/12 | (2006.01) |
| B63B 79/10 | (2020.01) |
| B63H 20/02 | (2006.01) |
| B63H 20/10 | (2006.01) |
| B63H 25/42 | (2006.01) |
| G01L 5/00 | (2006.01) |

(52) U.S. Cl.
CPC ............ *B63H 20/12* (2013.01); *B63B 79/10* (2020.01); *B63H 20/02* (2013.01); *B63H 20/10* (2013.01); *B63H 25/42* (2013.01); *G01L 5/0061* (2013.01)

(58) Field of Classification Search
CPC ........ B63H 20/12; B63H 20/02; B63H 20/10; B63H 25/42; B63B 79/10; G01L 5/0061
See application file for complete search history.

(56) References Cited

U.S. PATENT DOCUMENTS

| | | |
|---|---|---|
| 8,388,392 B2 | 3/2013 | Harada et al. |
| 9,669,914 B1 | 6/2017 | Hundertmark |
| 9,889,913 B1 | 2/2018 | Hundertmark |
| 10,005,533 B2 * | 6/2018 | Weber .................... B63H 25/20 |
| 10,167,070 B2 | 1/2019 | Weber et al. |
| 2002/0023579 A1 * | 2/2002 | Profitt .................... B63B 1/125 |
| | | 114/61.12 |
| 2005/0181687 A1 * | 8/2005 | Okumura ............... B63H 25/12 |
| | | 440/53 |
| 2015/0224845 A1 * | 8/2015 | Anderson ............ B60G 17/019 |
| | | 701/37 |
| 2017/0029084 A1 | 2/2017 | Burk et al. |
| 2017/0106960 A1 * | 4/2017 | Weber .................... B63H 20/12 |

FOREIGN PATENT DOCUMENTS

| | | |
|---|---|---|
| CA | 2720345 | 5/2011 |
| JP | H01114590 A | 5/1989 |
| JP | 2652788 B2 | 9/1997 |

OTHER PUBLICATIONS

Marinetech Products, Inc., Panther XPS By MarineTech Panther Power Steering Hydraulic Power Steering System, User Manual, 2017, pp. 1-15, Published by MarineTech Products, Inc., Vadnais Heights, MN, USA.

CMP Group Ltd., Panther XPS Gen 2 Power Steering, Brochure, Aug. 2021, p. 1.

* cited by examiner

Primary Examiner — Stephen P Avila

(57) ABSTRACT

Steering apparatuses, actuator apparatuses, stators, and electric motors are disclosed.

23 Claims, 13 Drawing Sheets

STEERING APPARATUSES AND ACTUATOR APPARATUSES

CROSS-REFERENCE TO RELATED APPLICATION

This application claims the benefit of, and priority to, U.S. provisional patent application No. 63/076,286 filed on Sep. 9, 2020. The entire contents of U.S. provisional patent application No. 63/076,286 are incorporated by reference herein.

FIELD

This disclosure relates generally to steering apparatuses and actuator apparatuses.

RELATED ART

Some steering apparatuses and actuator apparatuses are known but may have some disadvantages.

SUMMARY

According to at least one embodiment, there is disclosed a steering apparatus for steering a steering device of a marine vessel, the apparatus comprising: an actuator comprising an actuator body and an actuator ram movable relative to the actuator body in response to actuation of the actuator; wherein the actuator ram is coupled to the steering device such that movement of the actuator ram relative to the actuator body steers the steering device; wherein the actuator is operable to actuate in response to a force applied by a force-transfer body onto to the actuator ram; and wherein the actuator is backdrivable.

In some embodiments, the actuator comprises a motor operable to actuate the actuator.

In some embodiments, the motor is an electric motor.

According to at least one embodiment, there is disclosed a steering apparatus for steering a steering device of a marine vessel, the apparatus comprising: an actuator comprising an actuator body and an actuator ram movable relative to the actuator body in response to actuation of the actuator; wherein the actuator comprises a motor operable to actuate the actuator; wherein the motor is an electric motor; wherein the actuator ram is coupled to the steering device such that movement of the actuator ram relative to the actuator body steers the steering device; and wherein the actuator is operable to actuate in response to a force applied by a force-transfer body onto the actuator ram.

In some embodiments, the actuator is backdrivable.

In some embodiments, the motor comprises an output shaft, and the apparatus further comprises a threaded shaft coupled to the output shaft of the motor and threadedly coupled to the actuator ram such that rotation of the output shaft of the motor causes actuation of the actuator.

In some embodiments, the threaded shaft directly couples the output shaft of the motor to the actuator ram.

In some embodiments, the threaded shaft and the output shaft of the motor are integrally formed.

In some embodiments, the actuator is a linear actuator.

In some embodiments, the steering device is a marine engine.

In some embodiments, the actuator is mounted to the marine engine.

In some embodiments, the steering device is a rudder.

In some embodiments, the apparatus further comprises a transom mount mounted to the marine vessel at a stern of the marine vessel, the marine engine is mounted to the transom mount, and the actuator is mounted to the transom mount such that the actuator is mounted to the marine vessel at the stern of the marine vessel.

In some embodiments, the actuator is mounted to the marine vessel at a stern of the marine vessel.

In some embodiments, the apparatus further comprises the steering device.

In some embodiments, the apparatus further comprises a force sensor operable to measure the force applied by the force-transfer body onto the actuator ram.

According to at least one embodiment, there is disclosed an actuator apparatus comprising: an actuator body; an actuator ram movable relative to the actuator body in response to actuation of the actuator; and a force sensor operable to measure a force applied by a force-transfer body onto the actuator ram.

According to at least one embodiment, there is disclosed a steering apparatus for steering a steering device of a marine vessel, the apparatus comprising: an actuator body; an actuator ram movable relative to the actuator body in response to actuation of the actuator, wherein the actuator ram is coupled to the steering device such that movement of the actuator ram relative to the actuator body steers the steering device; and a force sensor positioned at a stern of the marine vessel and operable to measure a force applied by a force-transfer body at the stern of the marine vessel.

In some embodiments, the actuator is operable to actuate in response to the force applied by the force-transfer body.

In some embodiments, the actuator is backdrivable.

In some embodiments, the actuator comprises a motor operable to actuate the actuator.

In some embodiments, the motor is an electric motor.

In some embodiments, the motor comprises an output shaft, and the apparatus further comprises a threaded shaft coupled to the output shaft of the motor and threadedly coupled to the actuator ram such that rotation of the output shaft of the motor causes actuation of the actuator.

In some embodiments, the threaded shaft directly couples the output shaft of the motor to the actuator ram.

In some embodiments, the threaded shaft and the output shaft of the motor are integrally formed.

In some embodiments, the actuator is a linear actuator.

In some embodiments, the force sensor is coupled to the actuator ram such that that movement of the actuator ram relative to the actuator body causes movement of the force sensor relative to the actuator body.

In some embodiments, the force-transfer body is coupled to a helm of the marine vessel such that a force applied to the helm causes the force-transfer body to apply the force.

In some embodiments, the force-transfer body comprises an end of a steering cable coupled to the helm such that the force applied to the helm causes the end of the steering cable to apply the force.

In some embodiments, the force-transfer body is coupled to a steering cable coupled to the helm such that the force applied to the helm causes the force-transfer body to apply the force.

In some embodiments, the transom mount defines a tilt tube, the engine is rotatable relative to the marine vessel around the tilt tube, and the steering cable extends through the tilt tube.

In some embodiments, the transom mount comprises a rotatable portion that is rotatable relative to the marine vessel around the tilt tube, and the marine engine and the actuator are mounted to the transom mount at the rotatable portion of the transom mount.

In some embodiments, the apparatus further comprises at least one resilient body resiliently coupling the force-transfer body to the actuator ram such that the force-transfer body is resiliently movable relative to the actuator ram.

In some embodiments, the force sensor is operable to produce an electric signal in response to the force.

In some embodiments, the force sensor is operable to produce the electric signal in response to a position of the force-transfer body relative to the actuator ram.

In some embodiments, the force sensor is operable to produce the electric signal in response to a position of a magnet on the force-transfer body relative to the actuator ram.

In some embodiments, the apparatus further comprises an electrical conductor extending, at least, between the force sensor and a location within the actuator body.

According to at least one embodiment, there is disclosed an actuator apparatus comprising: an actuator body; an actuator ram movable relative to the actuator body in response to actuation of the actuator; and an electrical conductor extending, at least, between the actuator ram and a location within the actuator body.

In some embodiments, the electrical conductor extends, at least: within a cavity in the actuator ram; and within a cavity in the actuator body.

In some embodiments, the electrical conductor extends through a radially oriented opening in the actuator ram between the cavity in the actuator ram and the cavity in the actuator body.

In some embodiments, the electrical conductor is bent at a bend of the electrical conductor within the cavity in the actuator body, and wherein the bend of the electrical conductor moves along the cavity in the actuator body in response to movement of the actuator ram relative to the actuator body.

In some embodiments, the actuator body defines a channel in the cavity in the actuator body and positioned to receive and align the electrical conductor in the cavity in the actuator body.

In some embodiments, the apparatus further comprises a ribbon comprising the electrical conductor.

In some embodiments, the electrical conductor is in electrical communication with the electric motor.

In some embodiments, the electrical conductor is in electrical communication with a printed circuit board assembly ("PCBA") in electrical communication with the electric motor.

According to at least one embodiment, there is disclosed a marine vessel comprising the apparatus.

According to at least one embodiment, there is disclosed a stator for an electric motor, the stator comprising: a stator body defining a peripheral groove; a plurality of field coils of the stator; and at least one electrical conductor in the peripheral groove, each electrical conductor of the at least one electrical conductor in the peripheral groove electrically connecting a respective at least two of the plurality of field coils.

In some embodiments, the stator body is generally cylindrical.

In some embodiments, the peripheral groove is recessed in a generally cylindrical outer surface of the stator body.

In some embodiments, the peripheral groove is recessed in an outer surface of the stator body.

According to at least one embodiment, there is disclosed an electric motor comprising the stator.

In some embodiments, the electric motor has a plurality of phases, at least two of the plurality of field coils are associated with one of the plurality of phases, and an electrical conductor electrically connecting at least the two of the plurality of field coils is in the peripheral groove.

Other aspects and features will become apparent to those ordinarily skilled in the art upon review of the following description of illustrative embodiments in conjunction with the accompanying figures.

DETAILED DESCRIPTION

Figure 1:
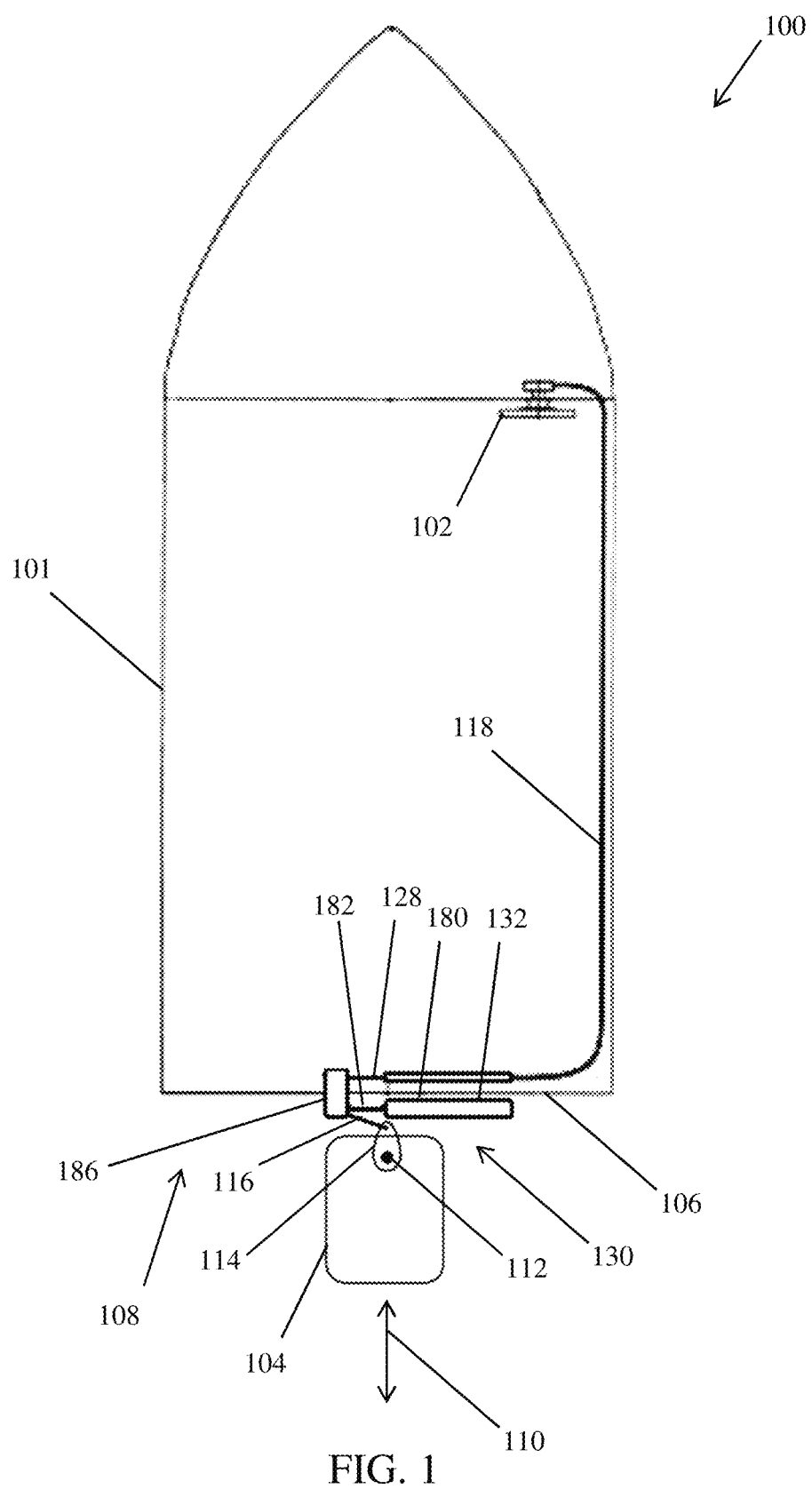
FIG. 1 is a plan view of a marine vessel according to one embodiment.

Referring to FIG. 1, a marine vessel according to one embodiment is shown generally at 100 and includes a hull 101, a helm 102, and a marine engine 104 mounted to a transom 106 of the marine vessel 100 at a stern shown generally at 108 of the marine vessel 100. In alternative embodiments, the marine engine 104 may be mounted to a jack plate of the marine vessel 100 at the stern 108 of the marine vessel 100.

The marine engine 104 is operable to exert a propulsion force along a direction 110, and both the marine engine 104 and the propulsion force direction 110 are laterally rotatable relative to the hull 101 or the transom 106 about an engine pivot 112 such that the marine engine 104 and the propulsion force direction 110 are laterally movable relative to the hull 101 or the transom 106 within a range of steering angles relative to the hull 101 or the transom 106 and such that lateral movement of the marine engine 104 relative to the hull 101 or the transom 106 and within the range of steering angles may steer the marine vessel 100. The marine engine 104 includes a tiller 114, and a draglink (or tiller connection) 116 is attached to the tiller 114 such that steering forces may be applied to the draglink 116 and transferred from the draglink 116 to the tiller 114 to rotate the marine engine 104 and the propulsion force direction 110 laterally relative to the hull 101 or the transom 106 about the engine pivot 112. The marine engine 104 is therefore an example of a steering device of the marine vessel 100. However, the marine engine 104 is an example only, and alternative embodiments may include one or more other steering devices.

The helm 102 may be a lever, a wheel, or another apparatus that an operator of the marine vessel 100 may turn or otherwise move relative to the hull 101 to indicate a desired steering angle of the marine engine 104 relative to the hull 101 or the transom 106. The helm 102 is coupled to a steering cable 118 such that when a turning or other moving force is applied to the helm 102, by an operator of the marine vessel 100, for example, the helm 102 transmits the force to the steering cable 118, and the steering cable 118 moves relative to the hull 101 or the transom 106 in response to turning or other movement of the helm 102 relative to the hull 101. The steering cable 118 is therefore an example of a force-transfer body that may transfer a turning or other moving force from the helm 102. However, the steering cable 118 is an example only, and alternative embodiments may include one or more other force-transfer bodies.

Figure 2:
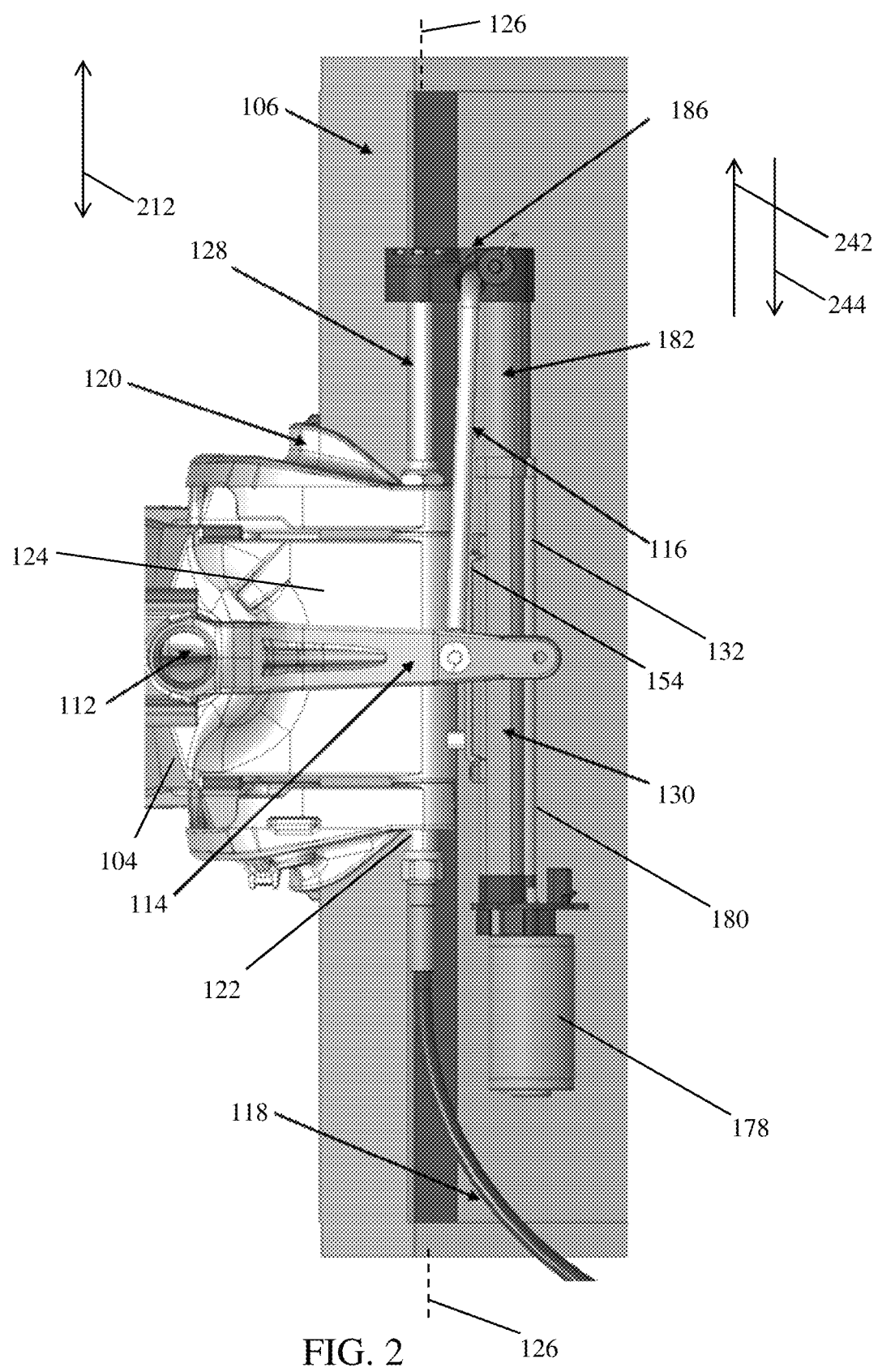
FIG. 2 is a plan view of a steering apparatus according to one embodiment on the marine vessel of FIG. 1.
Figure 3:
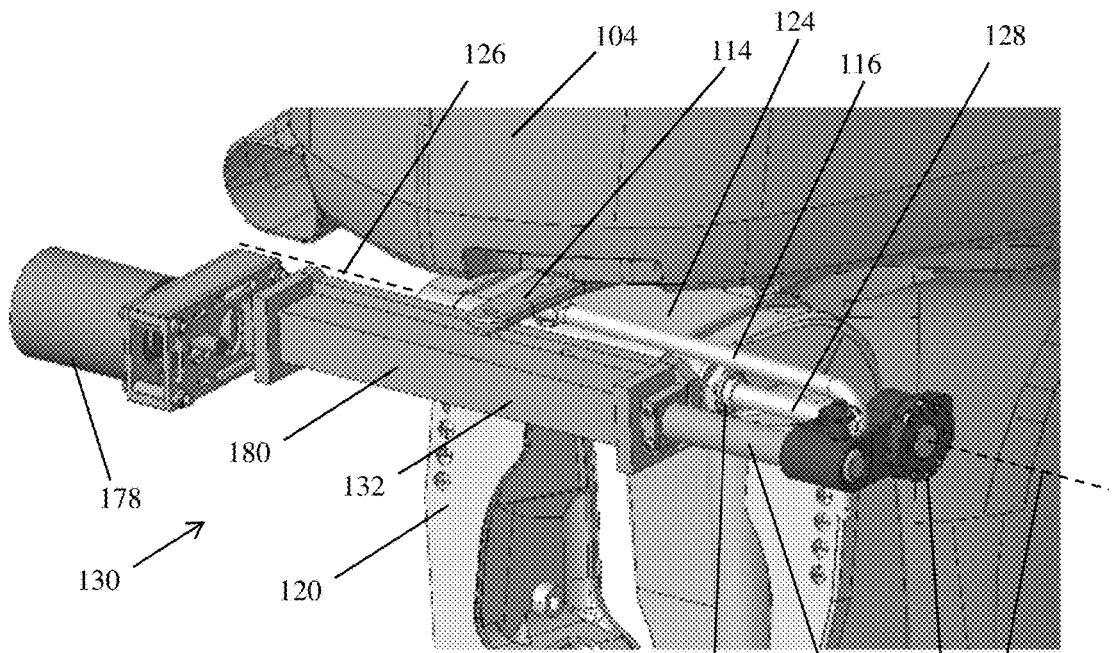
FIG. 3 is a perspective view of the steering apparatus of FIG. 2 on the marine vessel of FIG. 1.

Referring to FIG. 1 to FIG. 3, the marine vessel 100 includes a transom mount 120 that is mountable to the transom 106 to facilitate mounting the marine engine 104 to the transom 106. The transom mount 120 includes a tilt tube 122, and a rotatable portion 124 that may be rotated or tilted relative to the hull 101 or the transom 106 about an engine trim axis (or tilt axis) 126 extending transversely relative to the hull 101. The marine engine 104 may be mounted to the rotatable portion 124 such that the marine engine 104 may be rotated or tilted relative to the hull 101 or the transom 106 about the engine trim axis 126 to adjust a trim of the marine engine 104, for example. The steering cable 118 may be attached to, or may include, a steering ram 128 that may move in response to movement of the steering cable 118. The steering ram 128 is therefore another example of a force-transfer body that may transfer a turning or other moving force from the helm 102. However, the transom mount 120 and the steering ram 128 are examples only, and in alternative embodiments may differ.

Figure 4:
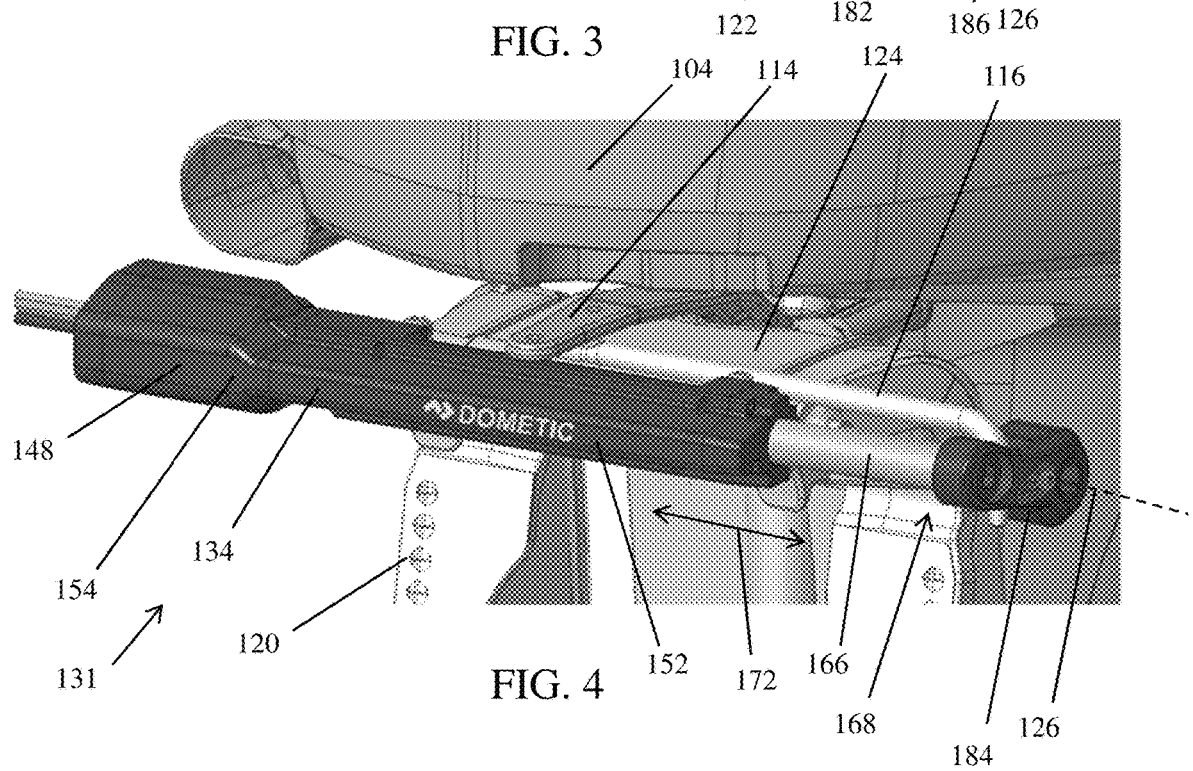
FIG. 4 is a perspective view of a steering apparatus according to another embodiment on the marine vessel of FIG. 1.

As shown in FIG. 1 to FIG. 3, the marine vessel 100 includes a steering apparatus shown generally at 130 for steering the marine engine 104. In one embodiment, the steering apparatus 130 includes a linear actuator 132 as shown in FIG. 1 to FIG. 3. Referring to FIG. 4, a steering apparatus according to another embodiment is shown generally at 131 and includes a linear actuator 134. The steering apparatus 130 is similar to the steering apparatus 131, the steering apparatus 131 and the steering apparatus 130 are interchangeable. Further, the linear actuator 132 is similar to the linear actuator 134, and the linear actuator 132 and the linear actuator 134 are interchangeable. Therefore, the following disclosure regarding the steering apparatus 130 may apply to the steering apparatus 131, the following disclosure regarding the steering apparatus 131 may apply to the steering apparatus 130, the following disclosure regarding the linear actuator 132 may apply to the linear actuator 134, and the following disclosure regarding the linear actuator 134 may apply to the linear actuator 132.

Figure 5:
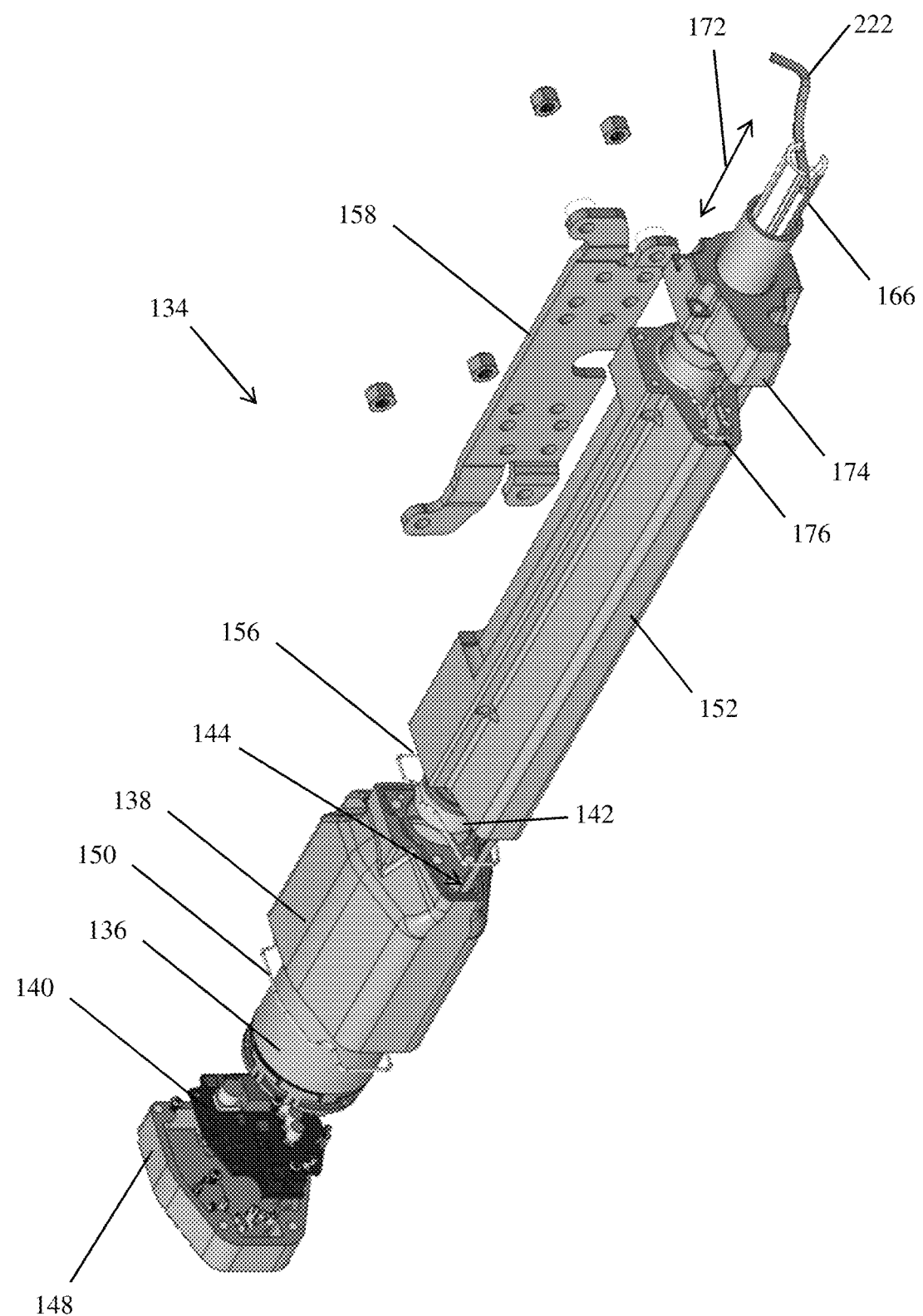
FIG. 5 is an exploded perspective view of a linear actuator of the steering apparatus of FIG. 4.
Figure 6:
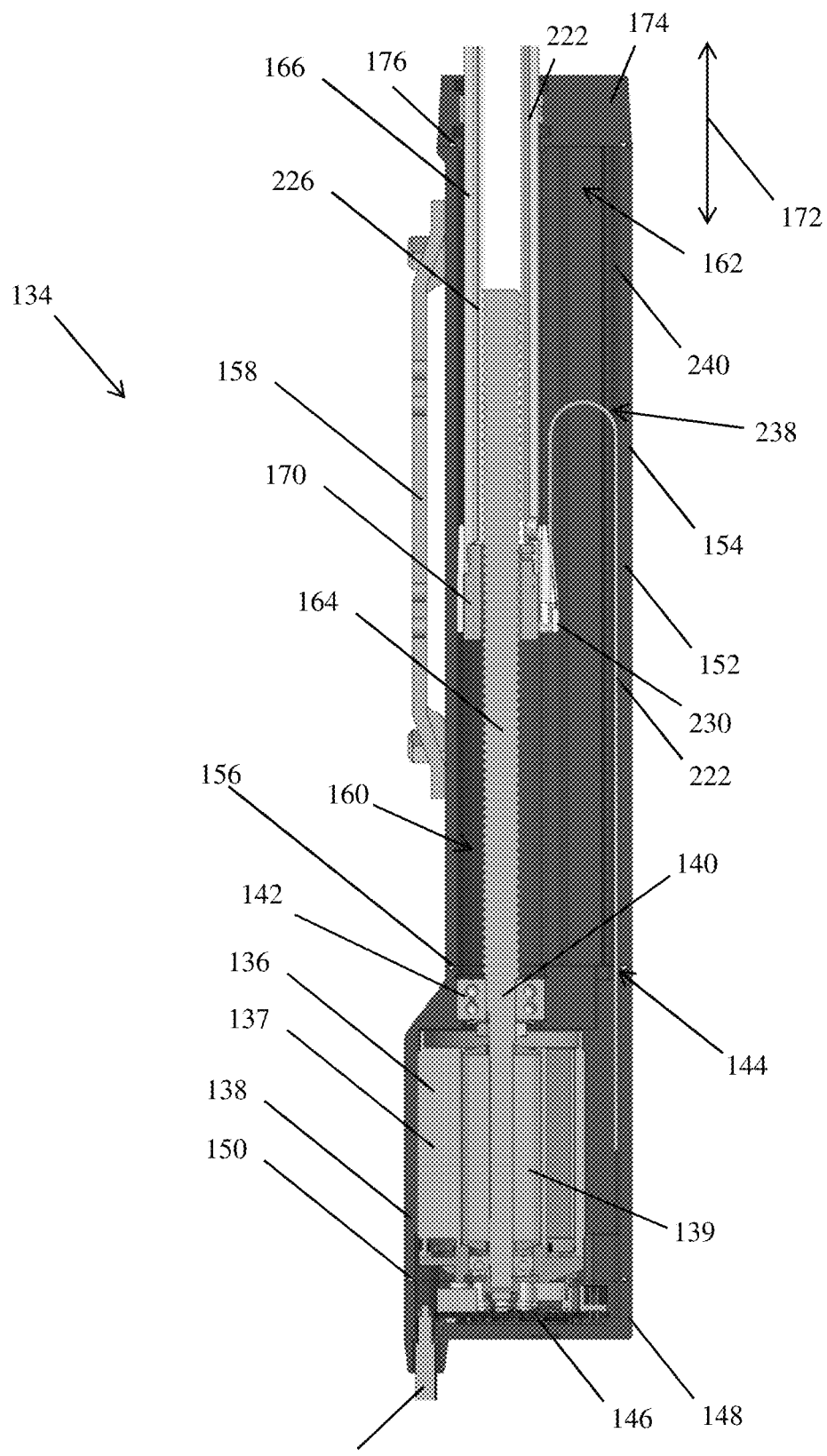
FIG. 6 is a cross-sectional view of the linear actuator of FIG. 5.

Referring to FIG. 4 to FIG. 6, the linear actuator 134 includes a motor 136. In the embodiment shown, the motor 136 is an electric motor including a stator 137 and a rotor 139, although alternative embodiments may differ and may, for example, include one or more different motors. The linear actuator 134 also includes a motor housing (or stator housing) 138, which may be forged aluminum or plastic, and the motor 136 may be received within the motor housing 138. The motor 136 has an output shaft 140, and the motor housing 138 includes a bearing 142 (which may be a duplex angular-contact bearing, for example) to support the output shaft 140 for rotation relative to the motor housing 138. The motor housing 138 also defines a through-opening shown generally at 144 for receiving an electrical conductor as described below.

The linear actuator 134 also includes a printed circuit board assembly ("PCBA") 146, a PCBA housing 148 for the PCBA 146, and an O-ring 150 positionable between the motor housing 138 and the PCBA housing 148 when the PCBA 146 is received within the PCBA housing 148 and when the motor 136 is received within the motor housing 138. The PCBA housing 148 may be forged aluminum. The motor housing 138 may be fastened to the PCBA housing 148 with the motor 136 within the motor housing 138, with the PCBA 146 within the PCBA housing 148, and with the O-ring 150 between the motor housing 138 and the PCBA housing 148.

Figure 7:
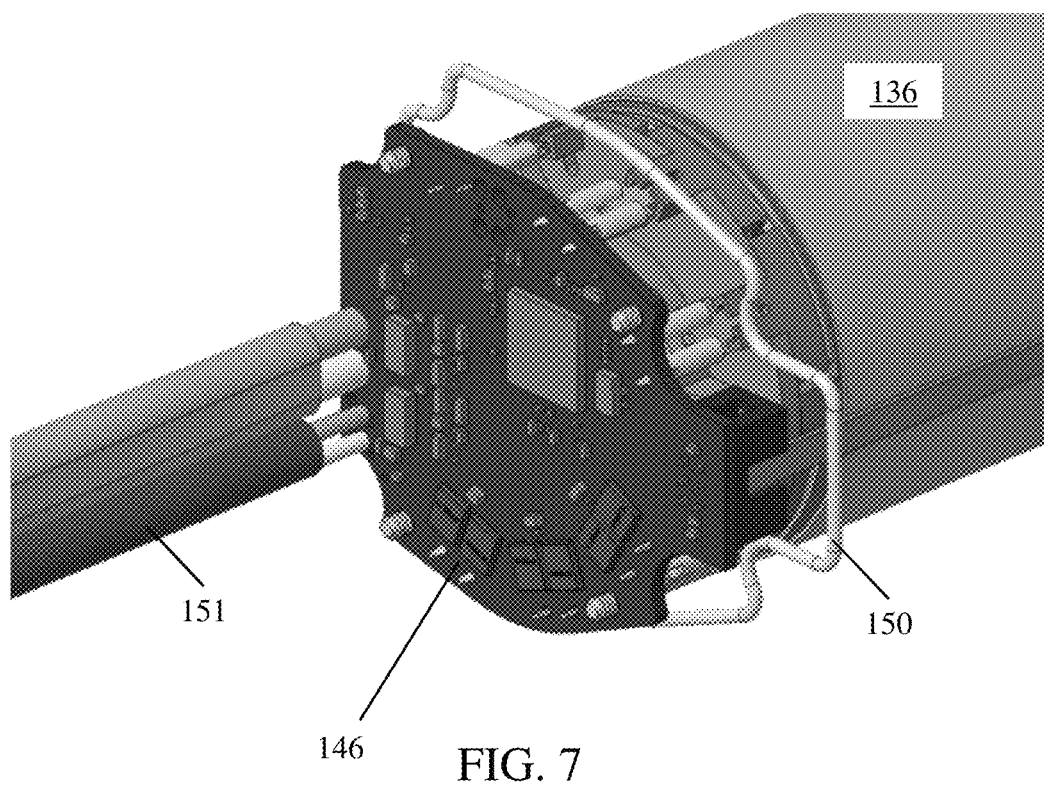
FIG. 7 is a perspective view of a printed circuit board assembly ("PCBA") and wire bundle 151 of the linear actuator of FIG. 5.
Figure 8:
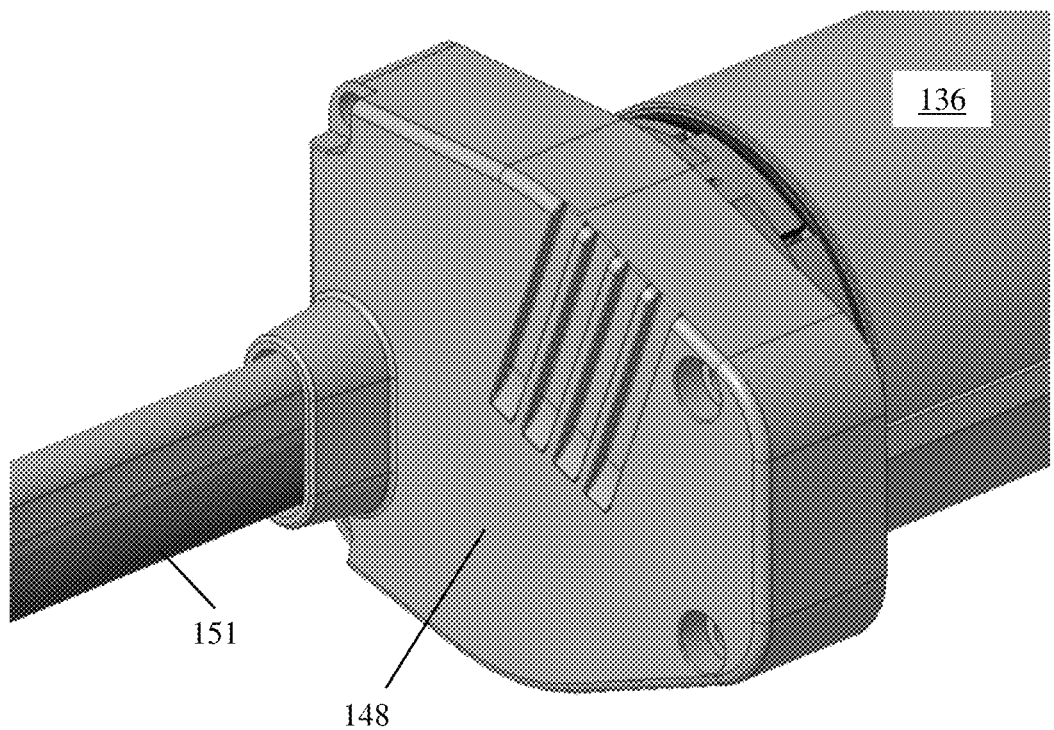
FIG. 8 is a perspective view of a PCBA housing and the wire bundle of the linear actuator of FIG. 5.

Referring to FIG. 6 to FIG. 8, a wire bundle 151 extends through the PCBA housing 148 and be in electrical connection with the PCBA 146. The wire bundle 151 includes electrical conductors that provide electrical current to the PCBA 146 and to the motor 136 to actuate the linear actuator 134. The wire bundle 151 may also include one or more other electrical conductors, such as one or more electrical conductors that can provide an ignition signal to a starter motor of the marine engine 104 when an ignition switch of the marine vessel 100 is put in an "ON" position, one or more electrical conductors that can communicate a status indicator signal (which may be used to light a light such as light-emitting diode ("LED") for example, sound a buzzer, or otherwise generate an alarm when potential faults occur to alert the operator of the faults), one or more grounded electrical conductors, one or more other electrical conductors, or a combination of two or more thereof, for example. The wire bundle 151 may be potted into the PCBA housing 148.

Referring back to FIG. 4 to FIG. 6, the linear actuator 134 also includes a ram housing 152, which may be extruded aluminum or plastic, and which may be fastened to the motor housing 138. The linear actuator 134 also includes an actuator gland (or actuator cap) 174 that may be fastened to the ram housing 152. The actuator gland 174 may be forged aluminum. When the PCBA housing 148 and the ram housing 152 are fastened to the motor housing 138 as shown in FIG. 4 to FIG. 6, and when the actuator gland 174 is fastened to the ram housing 152 as shown in FIG. 4 to FIG. 6, the motor housing 138, the PCBA housing 148, the ram housing 152, and the actuator gland 174 may collectively be referred to as an actuator body 154 of the linear actuator 134, although actuator bodies according to other embodiments may differ. For example, an actuator bodies according to another embodiment may be a one-piece molded body.

The linear actuator 134 also includes an O-ring 156 positionable between the motor housing 138 and the ram housing 152 when the ram housing 152 is fastened to the motor housing 138, and an O-ring 176 positionable between the ram housing 152 and the actuator gland 174 when the ram housing 152 is fastened to the actuator gland 174. When the PCBA housing 148 and the ram housing 152 are fastened to the motor housing 138 and the actuator gland 174 is fastened to the ram housing 152 as described above, the O-ring 150, the O-ring 156, and the O-ring 176 may facilitate sealing an interior of the actuator body 156.

Figure 9:
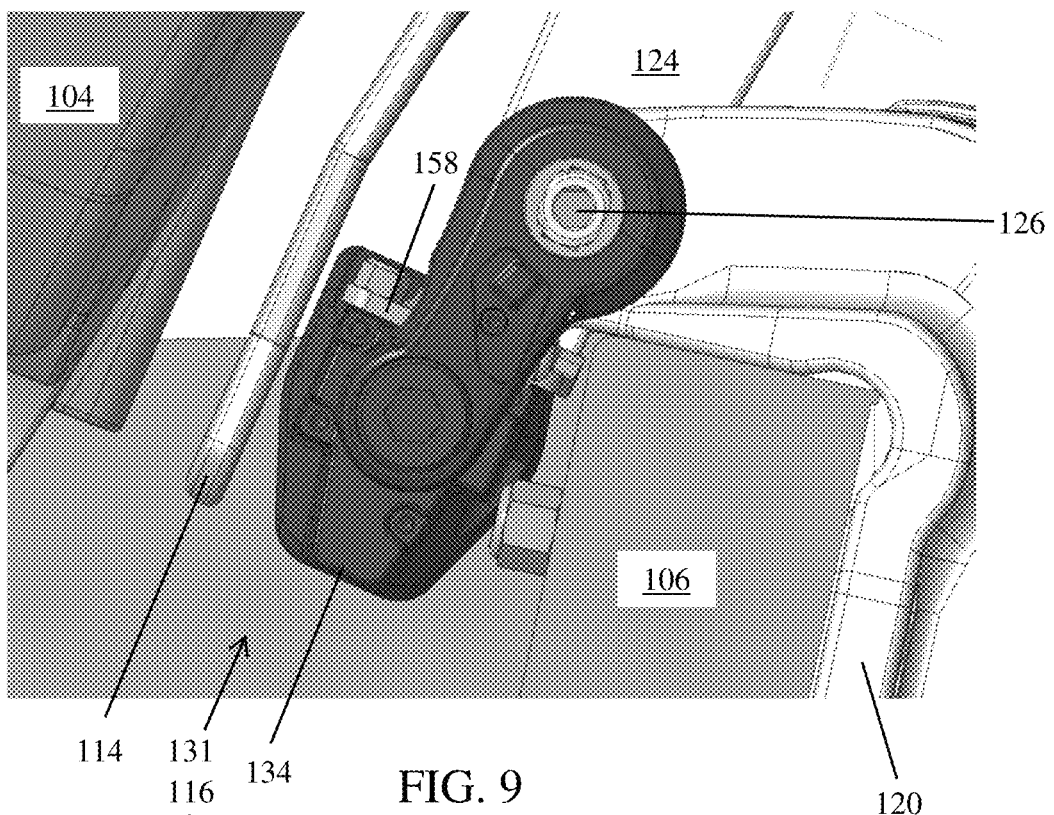
FIG. 9 is a side view of the linear actuator of FIG. 5 on the marine vessel of FIG. 1.

The ram housing 152 may be mounted to a mounting bracket (or dual-cable mount) 158, for example using mounting holes in the ram housing 152. The mounting bracket 158 may be stamped sheet metal. As shown in FIG. 2, the mounting bracket 158 may be mounted to the rotatable portion 124, or more generally to the transom mount 120. When the ram housing 152 is mounted to a mounting bracket 158, and when the mounting bracket 158 is mounted to the rotatable portion 124, the linear actuator 134 may be mounted to the rotatable portion 124 such that the linear actuator 134 may be rotated or tilted relative to the hull 101 or the transom 106 about the engine trim axis 126 when the marine engine 104 is rotated or tilted relative to the hull 101 or the transom 106 about the engine trim axis 126. FIG. 9 illustrates the engine 104 rotated or tilted to a maximum trim height, and as shown in FIG. 9, the linear actuator 134 and the steering apparatus 131 as a whole may be sized, shaped, and positioned to provide sufficient clearance to allow the marine engine 104 to be rotated or tilted relative to the hull 101 or the transom 106 within a range of trim angles about the engine trim axis 126. Further, when the ram housing 152 is mounted to a mounting bracket 158, and when the mounting bracket 158 is mounted to the rotatable portion 124, the actuator body 154 may remain stationary relative to the rotatable portion 124. Therefore, the actuator body 154 may remain stationary relative to the hull 101 or the transom 106, for example when the rotatable portion 124 remains stationary relative to the hull 101 or the transom 106.

The ram housing 152 also defines a ram space shown generally at 160 and an electrical conductor space shown generally at 162. In the ram space 160, a threaded shaft (or lead screw or ball screw) 164 may be machined, and may be integrally formed with or otherwise directly coupled to the output shaft 140 such that, without any gears or other intervening parts, rotation of the threaded shaft 164 at an angular speed causes rotation of the output shaft 140 at the same angular speed, and rotation of the output shaft 140 an angular speed causes rotation of the threaded shaft 164 at the same angular speed. However, alternative embodiments may differ and may. For example, in alternative embodiments, the output shaft 140 may be coupled to the threaded shaft 164 differently, and alternative embodiments may include one or more alternatives to the threaded shaft 164.

The linear actuator 134 also includes an actuator ram 166 having a free end shown generally at 168 and outside of the actuator body 154. The actuator ram 166 may be machined. At an end of the actuator ram 166 opposite the free end 168 and within the actuator body 154, the actuator ram 166 includes a ball screw nut 170 that may be machined, and that may be threadedly engaged with the threaded shaft 164. The actuator gland 174 includes a wear ring and seals to support the actuator ram 166 for movement in a linear and longitudinal actuation direction 172 relative to the actuator body 154, and further to seal the interior of the actuator body 156. The actuator ram 166 and a portion of the ram housing 152 defining the ram space 160 define complementary surfaces (such as surfaces of a key and of a keyed slot) that allow the actuator ram 166 to move in the actuation direction 172 relative to the actuator body 154, and that limit rotation of the actuator ram 166 relative to the actuator body 154.

When the motor rotates the output shaft 140, the output shaft 140 rotates the threaded shaft 164. Because the ball screw nut 170 is threadedly engaged with the threaded shaft 164, and because the complementary surfaces of the actuator ram 166 and of the ram housing 152 defining the ram space 160 limit rotation of the actuator ram 166 relative to the actuator body 154, rotation of the threaded shaft 164 causes the ball screw nut 170 and the actuator ram 166 as a whole to move in the actuation direction 172, and causes the free end 168 to move closer to or farther from the actuator body 154 in the actuation direction 172.

Further, in the embodiment shown, a force on the actuator ram 166 in the actuation direction 172 may cause rotation of the threaded shaft 164 absent any torque applied by motor 136 to the output shaft 140. The linear actuator 134 is therefore backdrivable, although alternative embodiments may differ.

As indicated above, the linear actuator 132 is similar to the linear actuator 134. Therefore, referring to FIG. 1 to FIG. 9, the linear actuator 132 includes a motor 178, an actuator body 180, and an actuator ram 182 similar to the motor 136, the actuator body 154, and the actuator ram 166 respectively.

Referring back to FIG. 4, the steering apparatus 131 further includes a sensor apparatus 184. As indicated above, the steering apparatus 130 is similar to the steering apparatus 131, and referring to FIG. 3 and to FIG. 4, the steering apparatus 130 includes a sensor apparatus 186 similar to the sensor apparatus 184.

Figure 10:
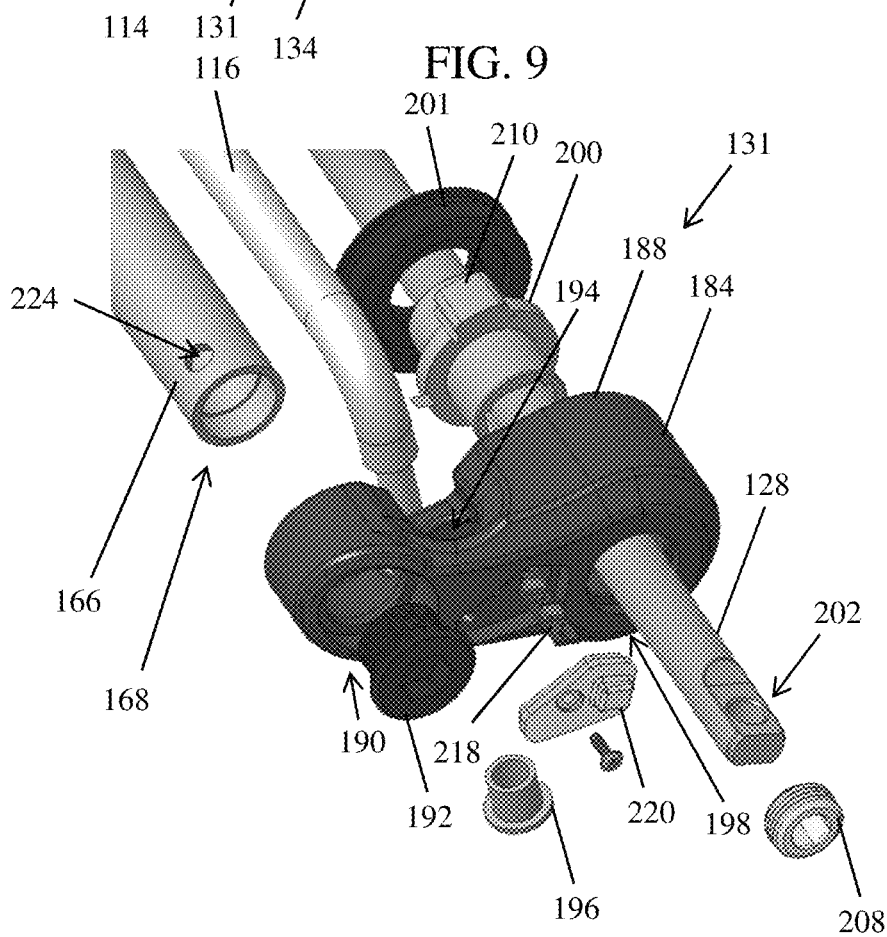
FIG. 10 is an exploded perspective view of a sensor apparatus of the steering apparatus of FIG. 4.
Figure 11:
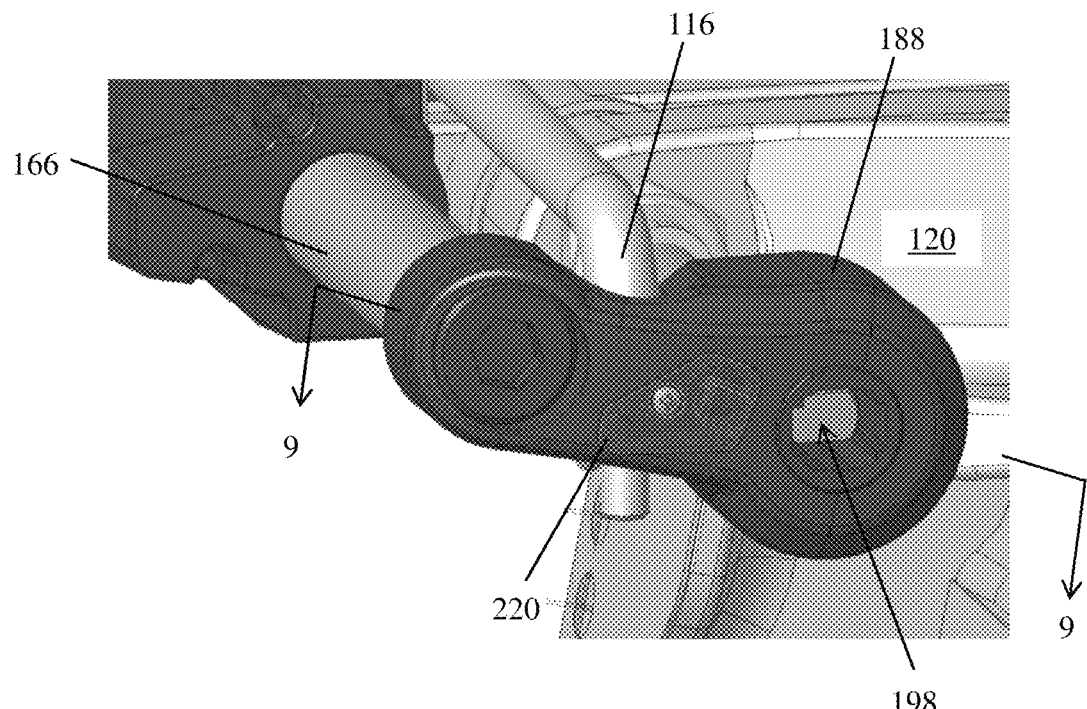
FIG. 11 is a perspective view of the sensor apparatus of FIG. 10.
Figure 12:
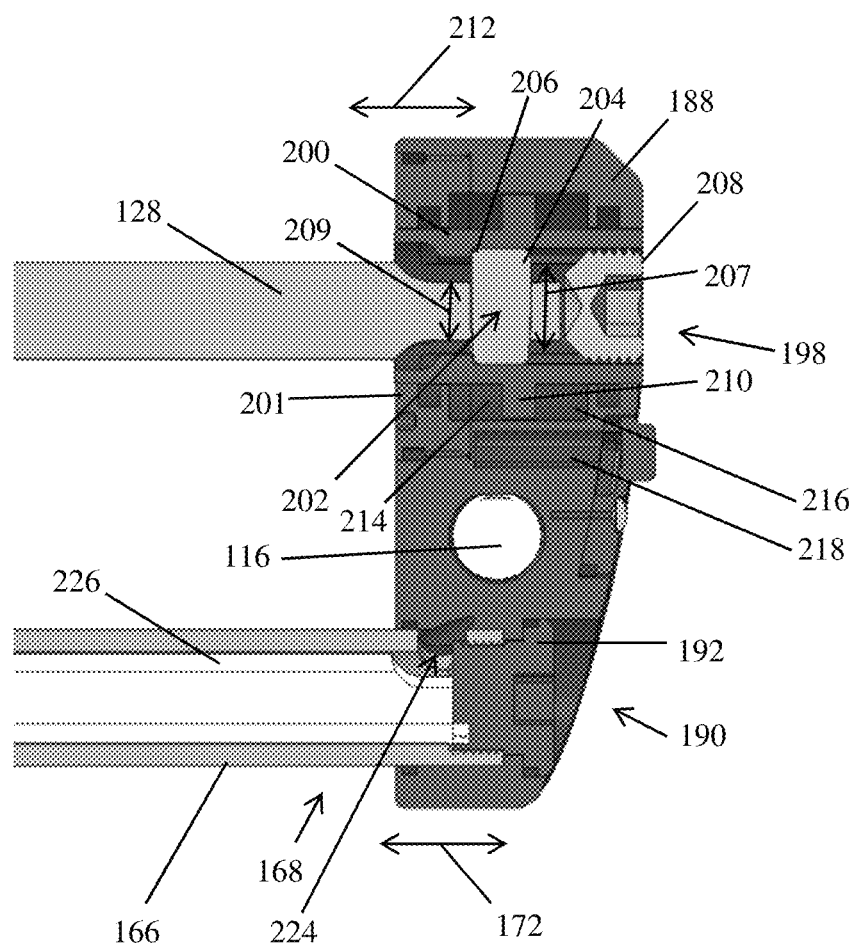
FIG. 12 is a cross-sectional view of the sensor apparatus of FIG. 10, taken along the line 9-9 in FIG. 11.

Referring to FIG. 10 to FIG. 12, the sensor apparatus 184 includes a sensor housing 188. The sensor housing 188 may be forged aluminum or die-cast aluminum. The sensor housing 188 defines an opening shown generally at 190 for receiving the free end 168 of the actuator ram 166 to facilitate coupling the free end 168 of the actuator ram 166 to the sensor apparatus 184. A threaded ram cap 192 may be machined, and may be threadedly engaged with the actuator ram 166 at the free end 168 in the opening 190 to couple the free end 168 of the actuator ram 166 to the sensor apparatus 184. Alternative embodiment may differ and, for example, may involve coupling the free end 168 of the actuator ram 166 to the sensor apparatus 184 in other ways. As indicated above, the actuator ram 166 is movable in the actuation direction 172 relative to the actuator body 154, and when the free end 168 of the actuator ram 166 is coupled to the sensor apparatus 184 and the actuator ram 166 moves in the actuation direction 172 relative to the actuator body 154, the sensor apparatus 184 moves with the actuator ram 166 in the actuation direction 172 relative to the actuator body 154.

The sensor housing 188 also defines an opening shown generally at 194 for receiving an end of the draglink 116 to facilitate coupling the end of the draglink 116 to the sensor apparatus 184 with a threaded mounting place or nylon-insert lock ("nyloc") nuts, for example. A bearing 196 may be positioned in the opening 194, and the end of the draglink 116 may be positioned in the bearing 196. Alternative embodiment may differ and, for example, may involve coupling the end of the draglink 116 to the sensor apparatus 184 in other ways. As indicated above, when the free end 168 of the actuator ram 166 is coupled to the sensor apparatus 184, and the actuator ram 166 moves in the actuation direction 172 relative to the actuator body 154, the sensor apparatus 184 moves with the actuator ram 166 in the actuation direction 172 relative to the actuator body 154. Therefore, when the end of the draglink 116 is also coupled to the sensor apparatus 184, the free end 168 of the actuator ram 166 is coupled to the sensor apparatus 184, and the actuator ram 166 moves in the actuation direction 172 relative to the actuator body 154, the sensor apparatus 184 and the end of the draglink 116 move with the actuator ram 166 in the actuation direction 172 relative to the actuator body 154.

The sensor housing 188 also defines an opening shown generally at 198 for receiving a clevis 200 and an end of the steering ram 128 to facilitate coupling the end of the steering ram 128 to the sensor apparatus 184. The clevis 200 may be forged aluminum. A housing cover 201 may be forged, cast, and/or machined aluminum and may be attached to the sensor housing 188 to retain the clevis 200 within the opening 198.

The steering ram 128 defines an opening shown generally at 202. In other steering apparatuses, the opening 202 may receive the end of the draglink 116 to couple the draglink 116 to the steering ram 128 directly. However, in the embodiment shown, the clevis 200 may be attached to the steering ram 128, for example by positioning a fastener 204 through the opening 202 and by retaining the fastener 204 in the clevis 200. In the embodiment shown, the clevis 200 has a retaining surface 206, and the fastener 204 may be retained against the retaining surface 206 by a retainer body 208 threadedly coupled to the clevis 200 against the end of the steering ram 128. As shown in FIG. 12, an interior of the clevis 200 has a width 207 that is greater than a width 209 of the end of the steering ram 128, which may allow the end of the steering ram 128 to be misaligned or to move within the interior of the clevis 200 in a direction along the fastener 204. However, alternative embodiments may differ. For example, in alternative embodiments, the clevis 200 may be attached the end of the steering ram 128 in other ways, and alternative embodiments may include alternatives to the clevis 200.

The clevis 200 includes a magnet 210, and when the clevis 200 is attached the end of the steering ram 128, the magnet 210, the clevis 200 as a whole, and the end of the steering ram 128 are all movable relative to the sensor housing 188 in a clevis direction 212. The end of the steering ram 128 is also movable relative to the sensor housing 188 in the clevis direction 212 in response to turning or other movement of the helm 102 relative to the hull 101 or the transom 106. In the embodiment shown, the clevis direction 212 is parallel to the actuation direction 172, but alternative embodiments may differ. The sensor apparatus 184 also includes a compression spring 214 and a compression spring 216 that urge the clevis 200 towards a center of a range of motion of the clevis 200 relative to the sensor housing 188 along the clevis direction 212. The compression spring 214 and the compression spring 216 are examples only, and alternative embodiments may include one or more other springs or other resilient bodies such that the clevis 200 is resiliently movable relative to the sensor housing 188. As indicated above, the free end 168 of the actuator ram 166 is coupled to the sensor apparatus 184, the end of the steering ram 128 is coupled to the clevis 200, and the clevis 200 is resiliently movable (or, more generally, movable) relative to the sensor housing 188, so the end of the steering ram 128 is resiliently movable (or, more generally, movable) relative to the actuator ram 166.

As the clevis 200 moves along the range of motion relative to the sensor housing 188 along the clevis direction 212, the magnet 210 moves with the clevis 200. The sensor apparatus 184 also includes a sensor 218. In the embodiment shown, the sensor 218 includes a magnetic sensor to sense a position of the magnet 210 indicative of a position of the clevis 200 moves along the range of motion relative to the sensor housing 188 along the clevis direction 212, and the sensor 218 also includes circuitry operable to produce one or more electrical signals indicative of the position of the clevis 200 along the range of motion relative to the sensor housing 188 along the clevis direction 212. A sensor cover 220 may be fastened to the sensor housing 188 to retain the sensor 218 in the sensor housing 188.

Because the clevis 200 is resiliently movable (or, more generally, movable) relative to the sensor housing 188, because the free end 168 of the actuator ram 166 is coupled to the sensor apparatus 184, and because the clevis 200 is attached the end of the steering ram 128, the position of the clevis 200 relative to the sensor housing 188 along the range of motion along the clevis direction 212 may indicate a force applied by the steering ram 128 on the free end 168 of the actuator ram 166 in response to a force transferred to the steering ram 128 from the helm 102.

Also, because the linear actuator 134 is backdrivable, a force applied by the draglink 116 on the sensor apparatus 184 may cause the actuator ram 166 and the sensor apparatus 184 to move relative to the actuator body 154. Such movement of the sensor apparatus 184 relative to the actuator body 154 may cause the sensor apparatus 184 to move relative to the end of the steering ram 128, which may also cause the end of the steering ram 128 to apply a force on the free end 168 of the actuator ram 166 opposing the force applied by the draglink 116 on the sensor apparatus 184. Such a force applied by the end of the steering ram 128 on the free end 168 of the actuator ram 166 may also cause the clevis to move relative to the sensor housing 188 along the range of motion along the clevis direction 212.

In summary, a force may be applied by the end of the steering ram 128 on the free end 168 of the actuator ram 166, either in response to a force transferred to the steering ram 128 from the helm 102, or in response to movement of the sensor apparatus 184 relative to the actuator body 154 caused by a force applied by the draglink 116 on the sensor apparatus 184. In either case, such a force applied by the end of the steering ram 128 on the free end 168 may cause movement of the clevis 200 relative to the sensor housing 188 along the range of motion along the clevis direction 212, and the sensor 218 may sense a position of the magnet 210 indicative of the direction and magnitude of such a force. As indicated above, the sensor 218 includes circuitry operable to produce one or more electrical signals indicative of the position of the clevis 200 along the range of motion relative to the sensor housing 188 along the clevis direction 212, so such one or more electrical signals may indicate the direction and magnitude of a force applied by the end of the steering ram 128 on the free end 168 of the actuator ram 166. The sensor 218 is an example only, and alternative embodiments may sense a force applied by the end of the steering ram 128 on the free end 168 of the actuator ram 166 in other ways.

Figure 13:
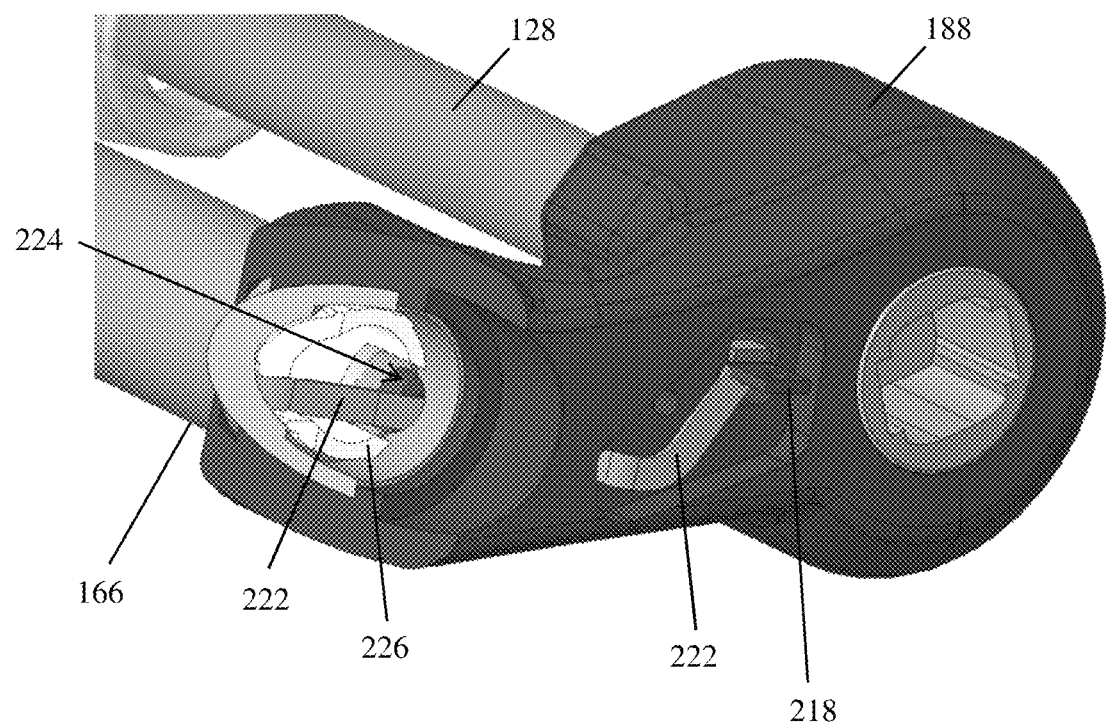
FIG. 13 is a perspective cutaway view of the sensor apparatus of FIG. 10.
Figure 14:
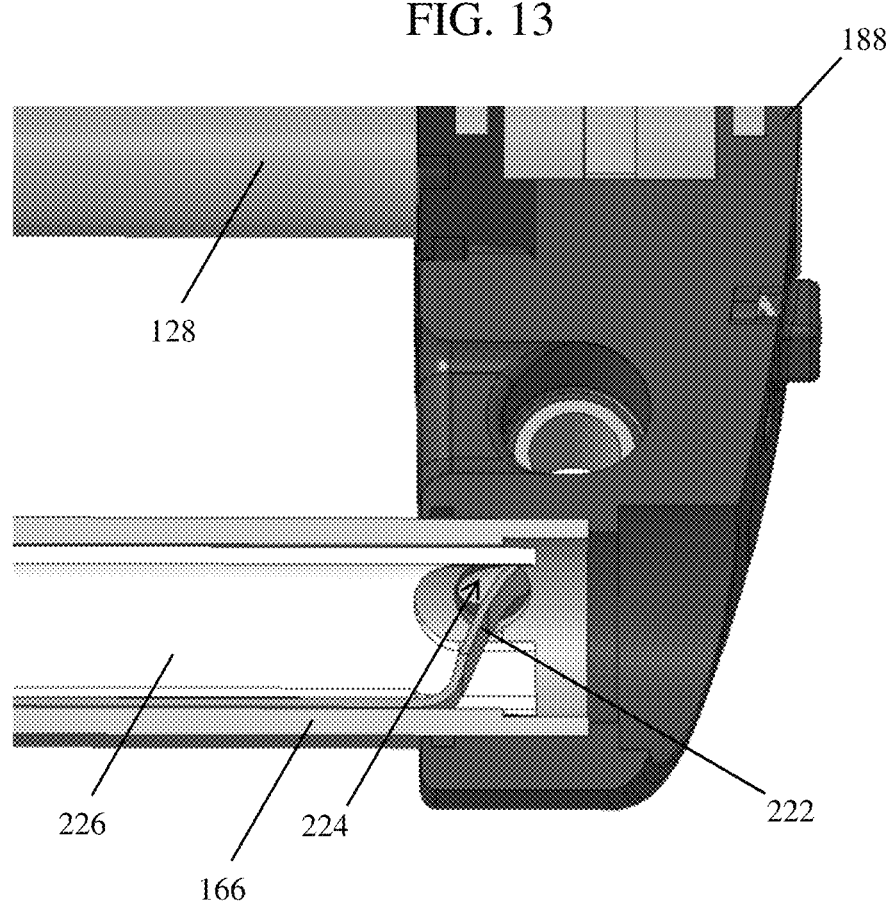
FIG. 14 is a cross-sectional view of the sensor apparatus of FIG. 10.

Referring to FIG. 13 and FIG. 14, a wire ribbon 222 includes one or more electrical conductors including one or more electrical conductors operable to communicate the one or more electrical signals indicative of the position of the clevis 200 along the range of motion relative to the sensor housing 188 along the clevis direction 212. The wire ribbon 222 may be positioned through the sensor housing 188 as shown in FIG. 13 and then positioned through a generally radial through-opening shown generally at 224 in the actuator ram 166. A wire tube, wire guide, or insert 226 is in the actuator ram 166. The insert 226 may be extruded plastic. As shown in FIG. 6, in FIG. 14, and in FIG. 15 for example, the wire ribbon 222 extends from the through-opening 224, across the insert 226, and along the actuator ram 166 between the actuator ram 166 and the insert 226 (and therefore within a cavity in the actuator ram 166). The insert 226 may therefore protect the wire ribbon 222 from the threaded shaft 164.

Figure 15:
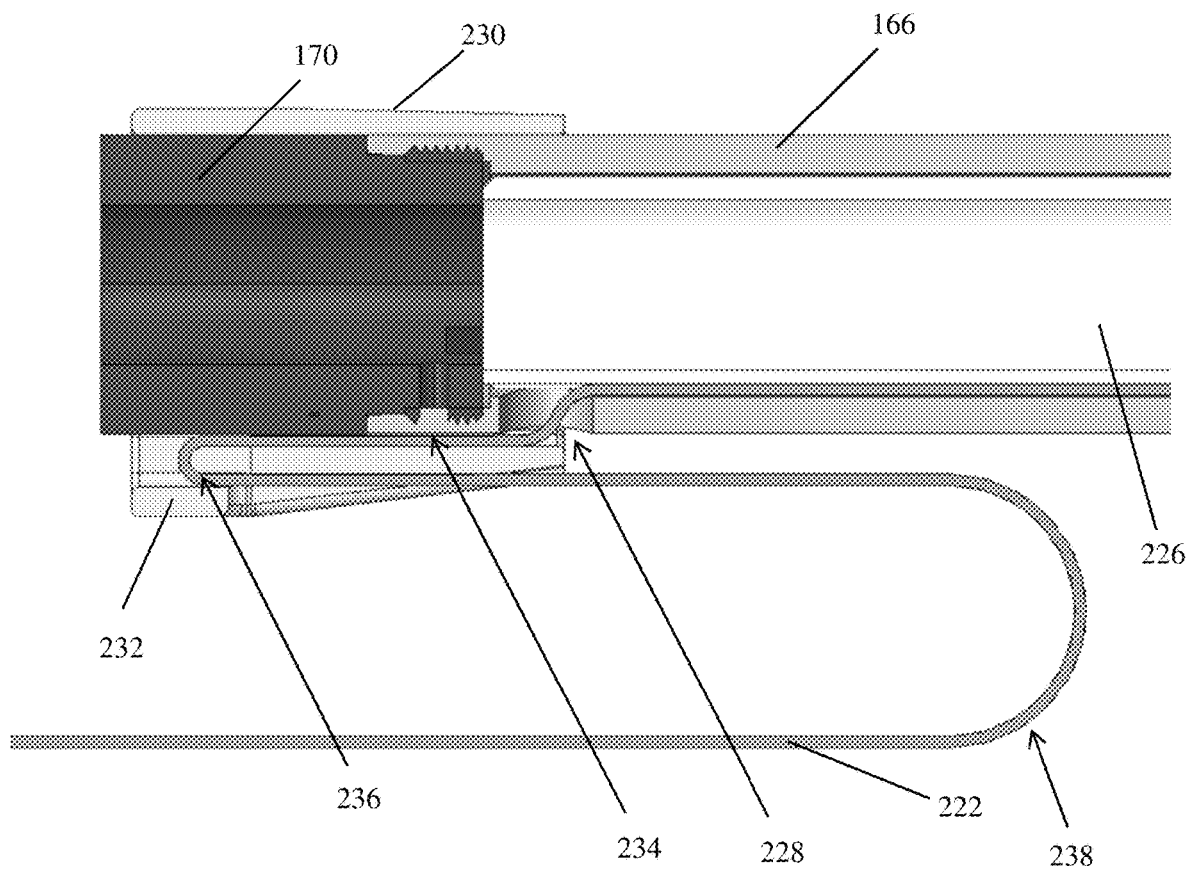
FIG. 15 is a cross-sectional view of an end of an actuator ram of the linear actuator of FIG. 5.
Figure 16:
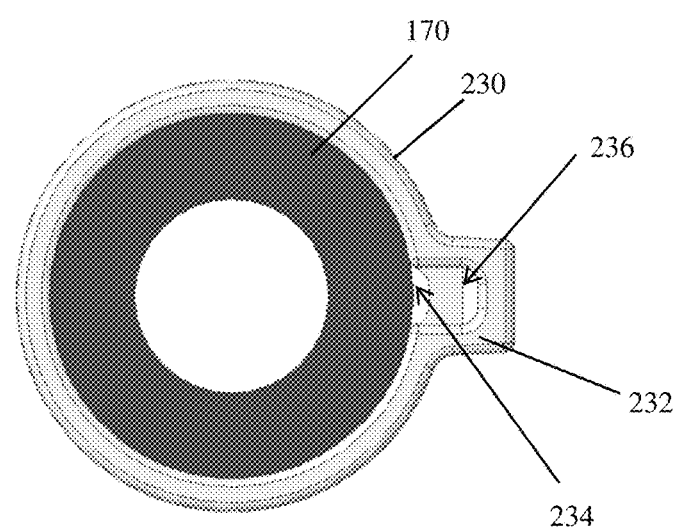
FIG. 16 is an end view of the actuator ram of FIG. 15.
Figure 17:
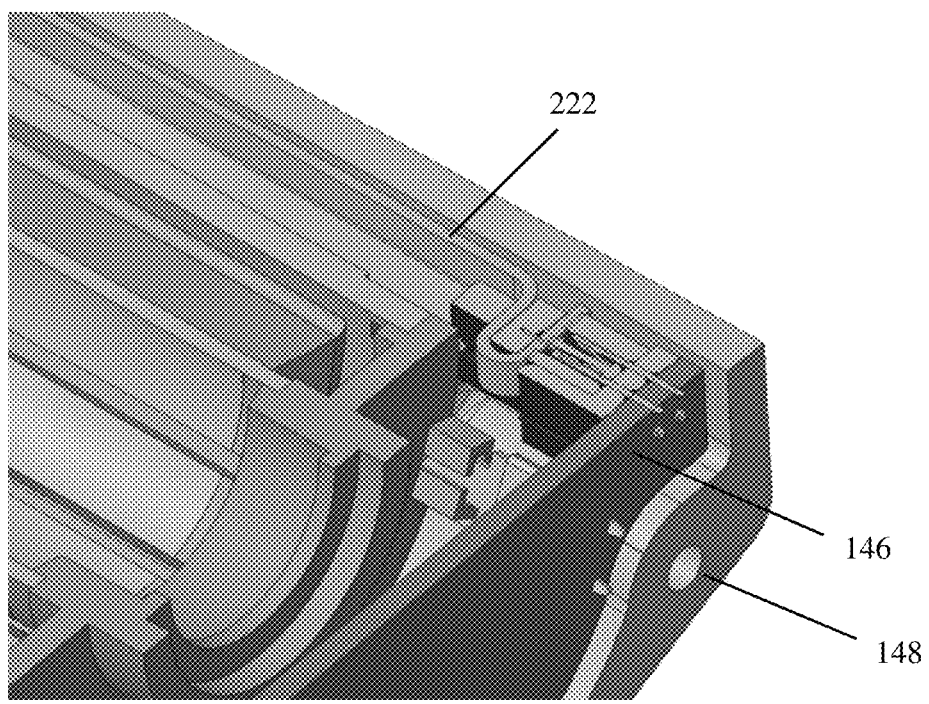
FIG. 17 is a cross-sectional and cutaway view of the PCBA of FIG. 7 and the PCBA housing of FIG. 8.
Figure 18:
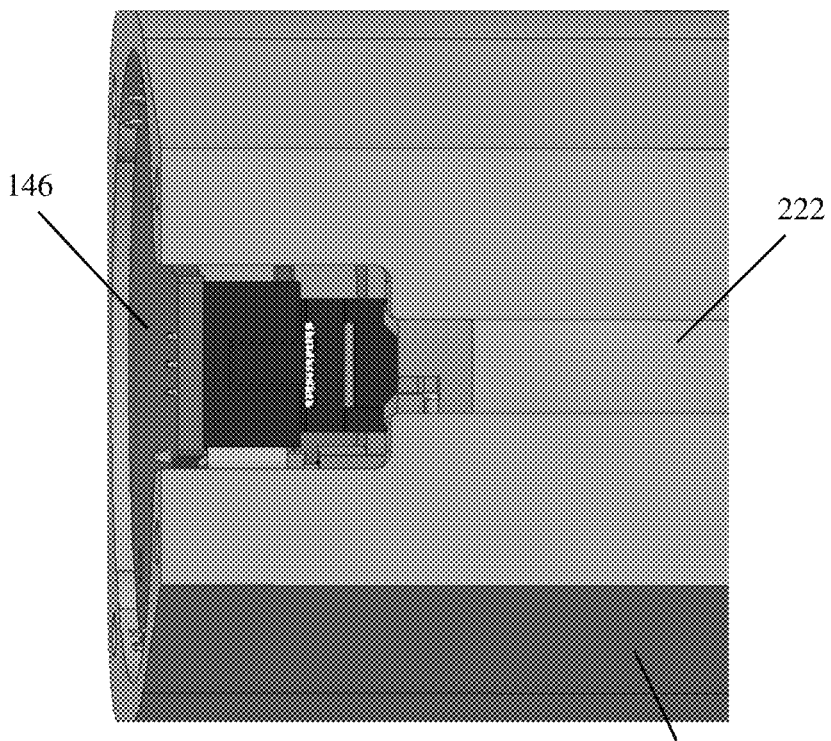
FIG. 18 is a cutaway view of the PCBA of FIG. 7 and the PCBA housing of FIG. 8.

Referring to FIG. 15 and to FIG. 16, near the ball screw nut 170, the wire ribbon 222 extends through a generally radial through-opening shown generally at 228 in the actuator ram 166 and between the cavity in the actuator ram 166 and the electrical conductor space 162, which is a cavity in the actuator body 154. During assembly, after the wire ribbon 222 is positioned through the through-opening 228, a rotation-limiting body 230 may be positioned around the end of the actuator ram 166 opposite the free end 168. In the embodiment shown, a generally radial projection 232 of the rotation-limiting body 230 has the surfaces that, as described above, are complementary to surfaces of the portion of the ram housing 152 defining the ram space 160 that allow the actuator ram 166 to move in the actuation direction 172 relative to the actuator body 154 and that limit rotation of the actuator ram 166 relative to the actuator body 154. Next during assembly, after the rotation-limiting body 230 is positioned around the end of the actuator ram 166, the wire ribbon 222 may be positioned through the rotation-limiting body 230 in an inner space shown generally at 234 in the rotation-limiting body 230, and the ball screw nut 170 may then be attached to the end of the actuator ram 166. Next during assembly, after the ball screw nut 170 is attached to the end of the actuator ram 166, the wire ribbon 222 may be positioned through the rotation-limiting body 230 in an outer space shown generally at 236 in the rotation-limiting body 230. Positioning a portion of the wire ribbon 222 in the spaces 234 and 236 may hold that portion of the wire ribbon 222 relative to the rotation-limiting body 230 and relative to the actuator ram 166 so that, as the actuator ram 166 moves in the actuation direction 172 relative to the actuator body 154, that portion of the wire ribbon 222 may move with the actuator ram 166 relative to the actuator body 154. A tight-fitting plastic piece may also hold that portion of the wire ribbon 222 relative to the rotation-limiting body 230 and relative to the actuator ram 166.

The rotation-limiting body 230 is an example only, and alternative embodiments may differ. For example, alternative embodiments may hold a portion of the wire ribbon 222 relative to the actuator ram 166 in other ways.

Referring to FIG. 6 and to FIG. 15, after the wire ribbon 222 extends through the through-opening 228 and through the spaces 234 and 236, the wire ribbon 222 extends into the electrical conductor space 162 (and therefore within a cavity in the actuator body 154). In the electrical conductor space 162, the wire ribbon 222 bends (or, more generally, rolls or furls) at a bend (or, more generally, a roll or a furl) shown generally at 238 in the wire ribbon 222 and then extends through the through-opening 144 and into the motor housing 138. Between the bend 238 and the through-opening 144, the wire ribbon 222 extends in a guide channel 240 defined by a portion of the ram housing 152 defining the electrical conductor space 162. Because a portion of the wire ribbon 222 is held relative to the actuator ram 166, the bend 238 moves relative to the actuator body 154 and portions of the wire ribbon 222 are removed from or received in the guide channel 240 in response to movement of the actuator ram 166 in the actuation direction 172 relative to the actuator body 154. More generally, the wire ribbon 222 may roll, furl, unroll, or unfurl in the electrical conductor space 162 in response to movement of the actuator ram 166 in the actuation direction 172 relative to the actuator body 154.

After passing through the through-opening 144, the wire ribbon 222 can be connected to the PCBA 146. The wire ribbon 222 therefore extends from the sensor 218 at the free end 168 of the actuator ram 166 to the PCBA 146 at a location in the actuator body 154 and may communicate, to the PCBA 146, the one or more electrical signals indicative of the position of the clevis 200 along the range of motion relative to the sensor housing 188 along the clevis direction 212 as described above. As indicated above, interiors of the sensor housing 188, of the actuator ram 166, and of the actuator body 156 may be sealed, and the wire ribbon 222 may be entirely within the sensor housing 188, the actuator ram 166, and the actuator body 156, which may protect the wire ribbon 222 and allow the one or more electrical signals indicative of the position of the clevis 200 along the range of motion relative to the sensor housing 188 along the clevis direction 212 to be communicated from the sensor 218 to the PCBA 146 without requiring any electrical conductors outside of such sealed interior spaces.

The PCBA 146 may be operable to control the motor 136 to actuate the linear actuator 134 by causing the motor 136 to move the actuator ram 166 in the actuation direction 172 relative to the actuator body 154 in response to the one or more electrical signals indicative of the position of the clevis 200 along the range of motion relative to the sensor housing 188 along the clevis direction 212 as described above, and therefore in response to a force applied by the steering ram 128 on the free end 168. In some embodiments, the PCBA 146 may detect faults in the linear actuator 134 and inform an operator of a marine vessel of the faults. Also, in some embodiments, a motor controller may limit a speed of the actuator ram 166 in the actuation direction 172 relative to the actuator body 154.

As indicated above, the linear actuator 132 is similar to the linear actuator 134. Referring back to FIG. 2, in operation, when one or more electrical signals from a sensor (similar to the sensor 218) on the actuator ram 182 indicate a force applied by the steering ram 128 on the actuator ram 182 in a direction 242 (for example, a port direction or another along the clevis direction 212), the linear actuator 132 may actuate by causing the actuator ram 182 to move relative to the actuator body 180 in the direction 242 (or in another direction towards a same side of the marine vessel 100 as the direction 242). Likewise, when one or more electrical signals from the sensor on the actuator ram 182 indicate a force applied by the steering ram 128 on the actuator ram 182 in a direction 244 (for example, a starboard direction or another along the clevis direction 212) opposite the direction 242, the linear actuator 132 may actuate by causing the actuator ram 182 to move relative to the actuator body 180 in the direction 244 (or in another direction towards a same side of the marine vessel 100 as the direction 244).

As indicated above, the end of the steering ram 128 is movable in the clevis direction 212 in response to turning or other movement of the helm 102, so the linear actuator 132 or the linear actuator 134 may function as power-assisted steering devices to steer a steering device (such as the marine engine 104) by applying a steering force to the steering device in a same direction as a steering force from the helm 102.

However, as also indicated above, because the linear actuator 134 is backdrivable, a force applied by the draglink 116 on the sensor apparatus 184 may cause the actuator ram 166 and the sensor apparatus 184 to move relative to the actuator body 154, resulting in an opposing force applied by the end of the steering ram 128 on the free end 168 of the actuator ram 166. Therefore, if a steering device (such as the marine engine 104) moves in a steering direction absent steering movement of the helm 102, the linear actuator 132 or the linear actuator 134 may apply an actuation force in a same direction as the force applied by the end of the steering ram 128 on the free end 168 of the actuator ram 166, which opposes the force applied by the draglink 116 on the sensor apparatus 184, so the linear actuator 132 or the linear actuator 134 may stabilize the steering device by resisting movement of the steering device in a steering direction absent steering movement of the helm 102.

Also, because the linear actuator 132 and the linear actuator 134 are backdrivable, steering movement of the helm 102 may steer a steering device (such as the marine engine 104) even if electrical power is unavailable to the linear actuator.

Figure 19:
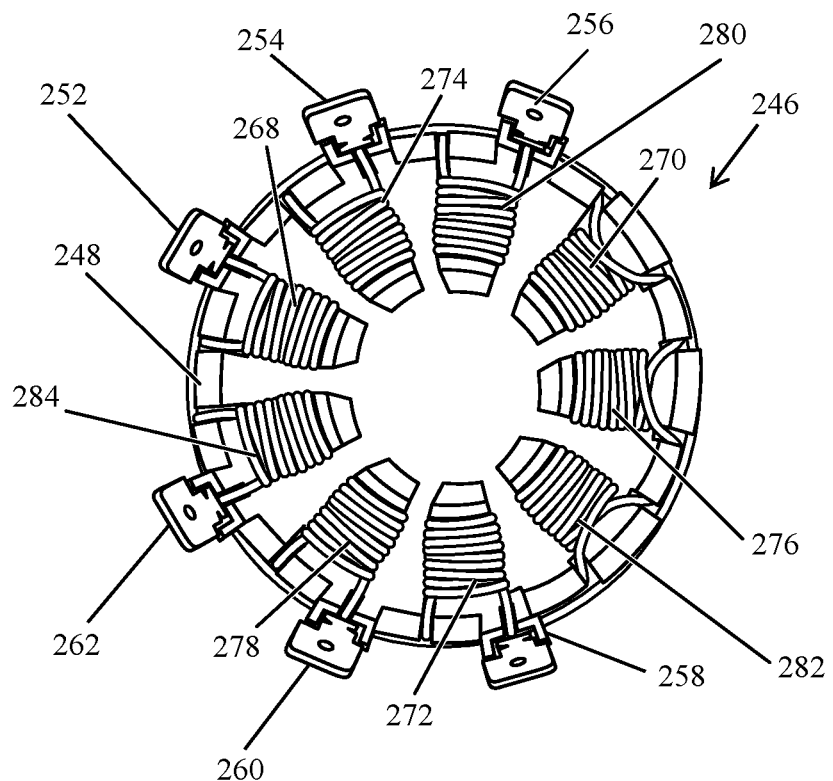
FIG. 19 is a plan view of a stator according to one embodiment.
Figure 20:
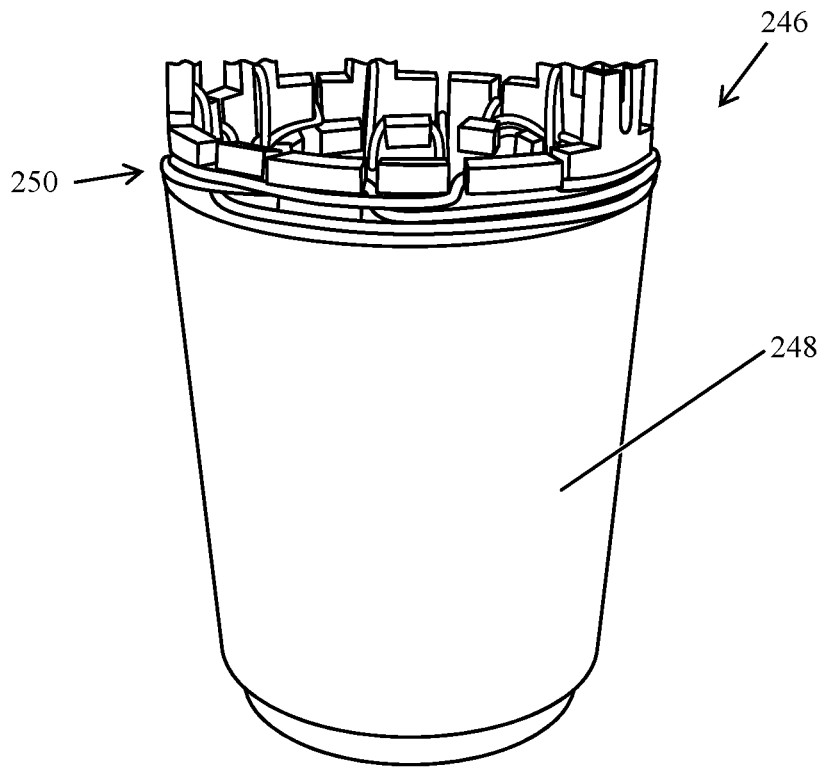
FIG. 20 is a perspective view of the stator of FIG. 19.

Referring to FIG. 19 and to FIG. 20, a stator according to one embodiment is shown generally at 246. The motor 136 or the motor 178 may include the stator 246, for example. The stator 246 includes a generally cylindrical stator body 248 defining a peripheral groove shown generally at 250 and recessed in a generally cylindrical outer surface of the stator body 248. However, a generally cylindrical stator body is not required, and stator bodies of alternative embodiments may have other shapes or other outer surfaces, and a peripheral groove of alternative embodiments may not necessarily be recessed in an outer surface of a stator body.

The stator 246 is a stator for a three-phase motor and therefore has six terminals 252, 254, 256, 258, 260, and 262, pairs of which are in electrical communication with respective sets of one or more field coils as shown in FIG. 19. For example, in the embodiment shown, the terminals 252 and 258 are in electrical communication with field coils 268, 270, and 272, the terminals 254 and 260 are in electrical communication with field coils 274, 276, and 278, and the terminals 256 and 262 are in electrical communication with field coils 280, 282, and 284, although alternative embodiments may differ.

As shown in FIG. 20, one or more electrical conductors in the peripheral groove 250 electrically connect the field coils in each set of field coils. For example, in the embodiment shown, an electrical conductor electrically connecting the field coils 268 and 270, an electrical conductor electrically connecting the field coils 270 and 272, an electrical conductor electrically connecting the field coils 274 and 276, an electrical conductor electrically connecting the field coils 276 and 278, an electrical conductor electrically connecting the field coils 280 and 282, an electrical conductor electrically connecting the field coils 282 and 284, or a combination of two or more thereof may be in the peripheral groove 250. In other words, one or more field coils associated with one of the phase may be electrically connected by electrical conductors in the peripheral groove 250.

Figure 21:
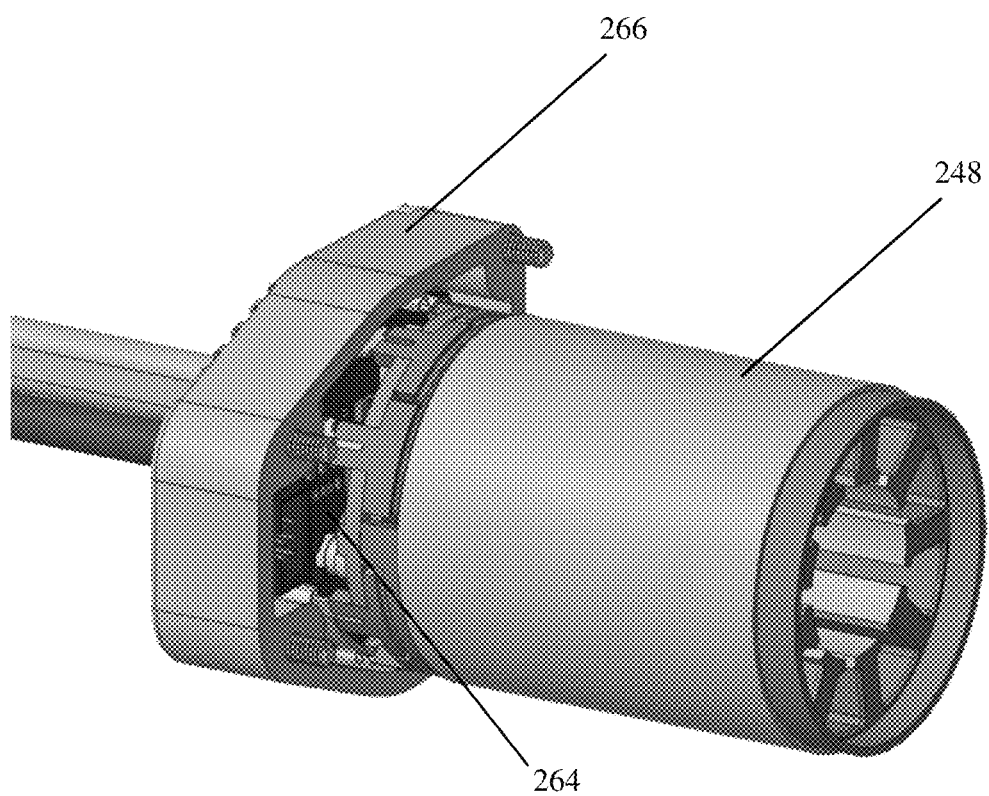
FIG. 21 is a perspective view of the stator of FIG. 19 in a press-fit with a PCBA and mounted to a PCBA housing according to one embodiment.

The terminals 252, 254, 256, 258, 260, and 262 may be electrically connected to a PCBA, for example by a press-fit with a PCBA 264 with the stator 246 mounted to a PCBA housing 266 as shown in FIG. 21, to provide electrical current to the field coils to apply a torque to a rotor.

The field coils of each phase may be formed from a single continuous electrical conductor, such as a magnet wire for example. In other words, in some embodiments, a single electrical conductor may be electrically connected to the terminal 252, form the field coil 268, extend in a portion of the peripheral groove 250, form the field coil 270, extend in a portion of the peripheral groove 250, form the field coil 272, and be electrically connected to the terminal 258. Likewise, in some embodiments, a single electrical conductor may be electrically connected to the terminal 254, form the field coil 274, extend in a portion of the peripheral groove 250, form the field coil 276, extend in a portion of the peripheral groove 250, form the field coil 278, and be electrically connected to the terminal 260. Likewise, in some embodiments, a single electrical conductor may be electrically connected to the terminal 256, form the field coil 280, extend in a portion of the peripheral groove 250, form the field coil 282, extend in a portion of the peripheral groove 250, form the field coil 284, and be electrically connected to the terminal 262.

In general, embodiments such as those described herein may function as power-assisted steering devices as described above but using an existing steering ram (such as the steering ram 128) and an existing tiller (such as the tiller 114), which may allow a marine vessel (such as the marine vessel 100) to be upgraded with power-assisted steering with limited modifications to the marine vessel.

The embodiments described above are examples only, and alternative embodiments may differ. For example, the steering device of the embodiments described above is the marine engine 104, but steering devices of alternative embodiments may differ. For example, in various embodiments, the steering device may be one or more outboard motors, one or more nozzles of a jet boat, one or more rudders (for example, on a marine vessel having one or more inboard motors), one or more outdrives or drive legs of a sterndrive marine propulsion system, or a combination of two or more thereof.

For example, some embodiments may include a boat- or hull-mounted linkage system and a rudder that may be steerable by applying steering forces to a rudder tiller (or lever) of the rudder. In such embodiments, for example, steering forces may be applied to the rudder tiller (or lever), as described above with reference to the tiller 114, to rotate and steer the rudder. Also, in such embodiments, a marine engine may not necessarily be transom-mounted, and an actuator may be transom-, boat-, or hull-mounted. Also, such embodiments may include a turn-buckle link, a drag link, or a direct link linking the actuator to the rudder tiller (or lever) of the rudder.

Therefore, although specific embodiments have been described and illustrated, such embodiments should be considered illustrative only and not as limiting the invention as construed according to the accompanying claims.

The invention claimed is:

1. An actuator apparatus comprising:
   an actuator body;
   an actuator ram movable relative to the actuator body in response to actuation of the actuator; and
   a force sensor operable to measure a force applied by a force-transfer body onto the actuator ram;
   wherein:
   the actuator is operable to actuate in response to the force applied by the force-transfer body;
   the actuator comprises a motor operable to actuate the actuator;
   the motor comprises an output shaft; and the apparatus further comprises a threaded shaft coupled to the output shaft of the motor and threadedly coupled to the actuator ram such that rotation of the output shaft of the motor causes actuation of the actuator.

2. The apparatus of claim 1 wherein the threaded shaft directly couples the output shaft of the motor to the actuator ram.

3. The apparatus of claim 1 wherein the threaded shaft and the output shaft of the motor are integrally formed.

4. The apparatus of claim 1 wherein the motor is an electric motor.

5. An actuator apparatus comprising:
an actuator body;
an actuator ram movable relative to the actuator body in response to actuation of the actuator; and
a force sensor operable to measure a force applied by a force-transfer body onto the actuator ram, wherein the force sensor is operable to sense the force in response to a position of the force-transfer body relative to the actuator ram and the actuator is operable to actuate in response to the force applied by the force-transfer body.

6. The apparatus of claim 5 wherein:
the actuator ram is coupled to a steering device of a marine vessel such that movement of the actuator ram relative to the actuator body steers the steering device;
the force sensor is positioned at a stern of the marine vessel; and
the force-transfer body is coupled to a helm of the marine vessel such that a force applied to the helm causes the force-transfer body to apply the force onto the actuator ram.

7. The apparatus claim 5 wherein the actuator is back-drivable.

8. The apparatus claim 5 wherein the actuator is a linear actuator.

9. The apparatus of claim 5 wherein the force sensor is coupled to the actuator ram such that that movement of the actuator ram relative to the actuator body causes movement of the force sensor relative to the actuator body.

10. The apparatus of claim 6 wherein the force-transfer body comprises an end of a steering cable coupled to the helm such that the force applied to the helm causes the end of the steering cable to apply the force.

11. The apparatus of claim 6 wherein the force-transfer body is coupled to a steering cable coupled to the helm such that the force applied to the helm causes the force-transfer body to apply the force.

12. The apparatus of claim 6 wherein:
the steering device is a marine engine;
the apparatus further comprises a transom mount mounted to the marine vessel at the stern of the marine vessel;
the marine engine is mounted to the transom mount;
the actuator is mounted to the transom mount such that the actuator is mounted to the marine vessel at the stern of the marine vessel;
the force-transfer body comprises an end of, or is coupled to, a steering cable coupled to the helm such that the force applied to the helm causes the force-transfer body to apply the force;
the transom mount defines a tilt tube;
the marine engine is rotatable relative to the marine vessel around the tilt tube; and
the steering cable extends through the tilt tube.

13. The apparatus of claim 5 further comprising at least one resilient body resiliently coupling the force-transfer body to the actuator ram such that the force-transfer body is resiliently movable relative to the actuator ram.

14. The apparatus of claim 5 wherein the force sensor is operable to produce an electric signal in response to the force and in response to the position of the force-transfer body relative to the actuator ram.

15. The apparatus of claim 14 wherein the force sensor is operable to produce the electric signal in response to a position of a magnet on the force-transfer body relative to the actuator ram.

16. An actuator apparatus comprising:
an actuator body;
an actuator ram movable relative to the actuator body in response to actuation of the actuator;
a force sensor operable to measure a force applied by a force-transfer body onto the actuator ram, wherein the actuator is operable to actuate in response to the force applied by the force-transfer body; and
an electrical conductor extending, at least, between the force sensor and a location within the actuator body.

17. The apparatus of claim 16 wherein the electrical conductor extends, at least:
within a cavity in the actuator ram; and
within a cavity in the actuator body.

18. The apparatus of claim 17 wherein the electrical conductor extends through a radially oriented opening in the actuator ram between the cavity in the actuator ram and the cavity in the actuator body.

19. The apparatus of claim 17 wherein the electrical conductor is bent at a bend of the electrical conductor within the cavity in the actuator body, and wherein the bend of the electrical conductor moves along the cavity in the actuator body in response to movement of the actuator ram relative to the actuator body.

20. The apparatus of claim 17 wherein the actuator body defines a channel in the cavity in the actuator body and positioned to receive and align the electrical conductor in the cavity in the actuator body.

21. The apparatus of claim 16 further comprising an electric motor operable to actuate the actuator, wherein the electrical conductor is in electrical communication with the electric motor or with a printed circuit board assembly ("PCBA") in electrical communication with the electric motor.

22. The apparatus of claim 16 further comprising at least one resilient body resiliently coupling the force-transfer body to the actuator ram such that the force-transfer body is resiliently movable relative to the actuator ram.

23. The apparatus of claim 16 wherein the force sensor is operable to produce an electric signal in response to the force.

* * * * *